(12) United States Patent
Nusbaum et al.

(10) Patent No.: US 12,682,907 B2
(45) Date of Patent: Jul. 14, 2026

(54) ONBOARD AIRCRAFT SYSTEM WITH ARTIFICIAL HUMAN INTERFACE TO ASSIST PASSENGERS AND/OR CREW MEMBERS

(71) Applicant: Gulfstream Aerospace Corporation, Savannah, GA (US)

(72) Inventors: Christopher Nusbaum, Savannah, GA (US); Brian Toler, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 343 days.

(21) Appl. No.: 17/659,199

(22) Filed: Apr. 14, 2022

(65) Prior Publication Data

US 2023/0335138 A1 Oct. 19, 2023

(51) Int. Cl.
| | |
|---|---|
| *G10L 17/22* | (2013.01) |
| *B64D 11/00* | (2006.01) |
| *G01V 11/00* | (2006.01) |
| *G06T 13/00* | (2011.01) |
| *G10L 17/04* | (2013.01) |
| *G10L 17/06* | (2013.01) |
| *G10L 17/18* | (2013.01) |

(52) U.S. Cl.
CPC .......... *G10L 17/22* (2013.01); *B64D 11/0015* (2013.01); *G01V 11/00* (2013.01); *G06T 13/00* (2013.01); *G10L 17/04* (2013.01); *G10L 17/06* (2013.01); *G10L 17/18* (2013.01)

(58) Field of Classification Search
CPC ......... G10L 17/22; G10L 17/04; G10L 17/06; G10L 17/18; G10L 2015/223; G10L 15/22; B64D 11/0015; B64D 11/00; G01V 1/00; G01V 9/00; G01V 11/00; G06T 13/00; G06F 3/167; G06F 3/16
See application file for complete search history.

(56) References Cited

U.S. PATENT DOCUMENTS

| | | | | |
|---|---|---|---|---|
| 9,043,846 | B2 * | 5/2015 | Cline | H04N 21/44209 |
| | | | | 725/77 |
| 11,938,820 | B2 * | 3/2024 | Biswal | G10L 15/22 |
| 2009/0055180 | A1 * | 2/2009 | Coon | B60R 16/0373 |
| | | | | 704/251 |
| 2016/0046298 | A1 * | 2/2016 | DeRuyck | B60K 28/066 |
| | | | | 340/576 |
| 2016/0372117 | A1 * | 12/2016 | Klose | G10L 17/00 |

(Continued)

*Primary Examiner* — Huyen X Vo
(74) *Attorney, Agent, or Firm* — Ingrassia Fisher & Lorenz, LLP

(57) ABSTRACT

A system onboard an aircraft includes: a proximity sensor to detect users within an area; a display monitor in the area; a processor; and a processor-readable medium storing executable instructions to perform a method that involves: detecting presence of a user within the area, based on output of the sensor; causing display of an animated digital representation of an assistant on the monitor; controlling the animated digital representation of the assistant to react to speech input; processing speech input of the user to identify at least one action to be carried out onboard the aircraft; controlling the animated digital representation of the assistant to respond to the identified at least one action; and issuing at least one command, instruction, or control signal to the component onboard the aircraft, to initiate the identified at least one action.

20 Claims, 6 Drawing Sheets

(56)     References Cited

U.S. PATENT DOCUMENTS

| 2019/0130916 A1* | 5/2019 | Mori ....................... G06F 3/167 |
| 2020/0251108 A1* | 8/2020 | Suzuki .................... G10L 15/05 |
| 2020/0286452 A1* | 9/2020 | Kubota ................... G06F 3/167 |
| 2022/0254216 A1* | 8/2022 | Schwarzli ............... G07F 9/023 |
| 2022/0412752 A1* | 12/2022 | Vogt ................... G06Q 30/0645 |
| 2023/0215295 A1* | 7/2023 | Daniali ............... G09B 21/009 |
| | | 704/4 |

* cited by examiner

100

104

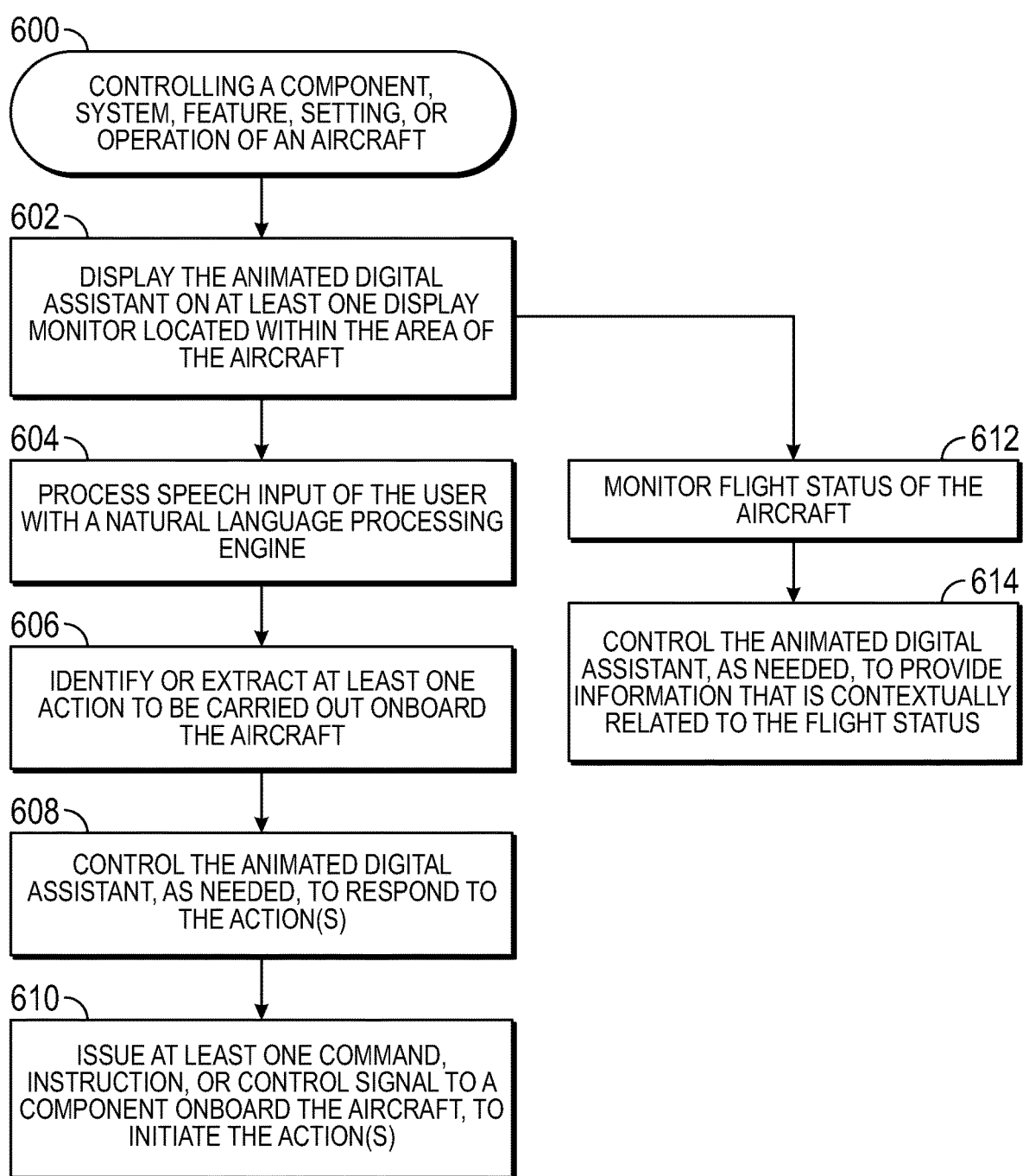

600 — CONTROLLING A COMPONENT, SYSTEM, FEATURE, SETTING, OR OPERATION OF AN AIRCRAFT

602 — DISPLAY THE ANIMATED DIGITAL ASSISTANT ON AT LEAST ONE DISPLAY MONITOR LOCATED WITHIN THE AREA OF THE AIRCRAFT

604 — PROCESS SPEECH INPUT OF THE USER WITH A NATURAL LANGUAGE PROCESSING ENGINE

606 — IDENTIFY OR EXTRACT AT LEAST ONE ACTION TO BE CARRIED OUT ONBOARD THE AIRCRAFT

608 — CONTROL THE ANIMATED DIGITAL ASSISTANT, AS NEEDED, TO RESPOND TO THE ACTION(S)

610 — ISSUE AT LEAST ONE COMMAND, INSTRUCTION, OR CONTROL SIGNAL TO A COMPONENT ONBOARD THE AIRCRAFT, TO INITIATE THE ACTION(S)

612 — MONITOR FLIGHT STATUS OF THE AIRCRAFT

614 — CONTROL THE ANIMATED DIGITAL ASSISTANT, AS NEEDED, TO PROVIDE INFORMATION THAT IS CONTEXTUALLY RELATED TO THE FLIGHT STATUS

FIG. 6

ONBOARD AIRCRAFT SYSTEM WITH ARTIFICIAL HUMAN INTERFACE TO ASSIST PASSENGERS AND/OR CREW MEMBERS

TECHNICAL FIELD

Embodiments of the subject matter described herein relate generally to aircraft communication and control systems. More particularly, embodiments of the subject matter relate to computer-based automated user assistance and aircraft control systems.

BACKGROUND

Passenger vehicles such as aircraft, trains, and subways can be staffed with attendants, porters, and crew members to maintain and service the vehicles, to provide assistance to passengers, and/or to control the operation of the vehicles. Modern passenger vehicles employ computer-based or electronic systems that: provide convenience or entertainment services to the passengers; control certain features, devices, or subsystems onboard the vehicles; or control the operation of the vehicles. For example, an interactive computer-based control panel of an aircraft can enable passengers and/or flight crew members to configure and change various settings, functions, or components in the cabin of the aircraft (e.g., lighting, interior temperature, audio volume of video or audio content, seat position), order food or drinks, select audio or video programming, etc. Although computer technology and automation techniques have become more sophisticated and commonplace, some passengers and flight crew members may prefer human contact and human interaction. Moreover, users who are unfamiliar with modern technology and computer-generated user interfaces may be intimidated by automated systems onboard a passenger vehicle and/or feel too awkward or embarrassed to use such automated systems.

Accordingly, it is desirable to have an automated computer-implemented control system onboard a vehicle (such as an aircraft) that is easy to use, intuitive, and non-intimidating. In addition, it is desirable to have an automated user assistance system onboard an aircraft that can serve the needs of passengers in the aircraft cabin and/or the needs of the flight crew in the flight deck of the aircraft. Furthermore, other desirable features and characteristics will become apparent from the subsequent detailed description and the appended claims, taken in conjunction with the accompanying drawings and the foregoing technical field and background.

BRIEF SUMMARY

Disclosed here is an automated method of controlling a component onboard a vehicle. Certain embodiments of the method involve: detecting presence of a user within a particular area of the vehicle supported by a display monitor of an onboard user assistance system, wherein the detecting is based on output of a proximity sensor; in response to the detecting, causing display of an animated digital representation of an assistant on the display monitor; controlling the animated digital representation of the assistant to react to speech input; processing speech input of the user with a natural language processing engine to identify at least one action to be carried out onboard the aircraft; controlling the animated digital representation of the assistant to respond to the identified at least one action; and issuing at least one command, instruction, or control signal to the component onboard the vehicle, to initiate the identified at least one action.

Also disclosed is a user assistance system onboard an aircraft. Certain embodiments of the system include: a proximity sensor configured to detect presence of users within a particular area of the aircraft; a display monitor located within the particular area; at least one processor; and at least one processor-readable medium associated with the at least one processor, the at least one processor-readable medium storing processor-executable instructions configurable to be executed by the at least one processor to perform an automated method of controlling a component onboard the aircraft. Certain embodiments of the method involve: detecting presence of a user within the particular area of the aircraft, wherein the detecting is based on output of the proximity sensor; in response to the detecting, causing display of an animated digital representation of an assistant on the display monitor; controlling the animated digital representation of the assistant to react to speech input; processing speech input of the user with a natural language processing engine to identify at least one action to be carried out onboard the aircraft; controlling the animated digital representation of the assistant to respond to the identified at least one action; and issuing at least one command, instruction, or control signal to the component onboard the aircraft, to initiate the identified at least one action.

Also disclosed is at least one non-transitory machine-readable storage medium having executable instructions stored thereon. The instructions are configurable to cause at least one processor onboard an aircraft to perform an automated method of controlling a component onboard the aircraft. Certain embodiments of the method involve: detecting presence of a user within a particular area of the aircraft supported by a display monitor, wherein the detecting is based on output of a proximity sensor; in response to the detecting, causing display of an animated digital representation of an assistant on the display monitor; controlling the animated digital representation of the assistant to react to speech input; processing speech input of the user with a natural language processing engine to identify at least one action to be carried out onboard the aircraft; controlling the animated digital representation of the assistant to respond to the identified at least one action; and issuing at least one command, instruction, or control signal to the component onboard the aircraft, to initiate the identified at least one action.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 6 is a flow chart that illustrates an exemplary embodiment of a process for controlling a component, system, feature, setting, or operation of an aircraft.

DETAILED DESCRIPTION

Figure 1:
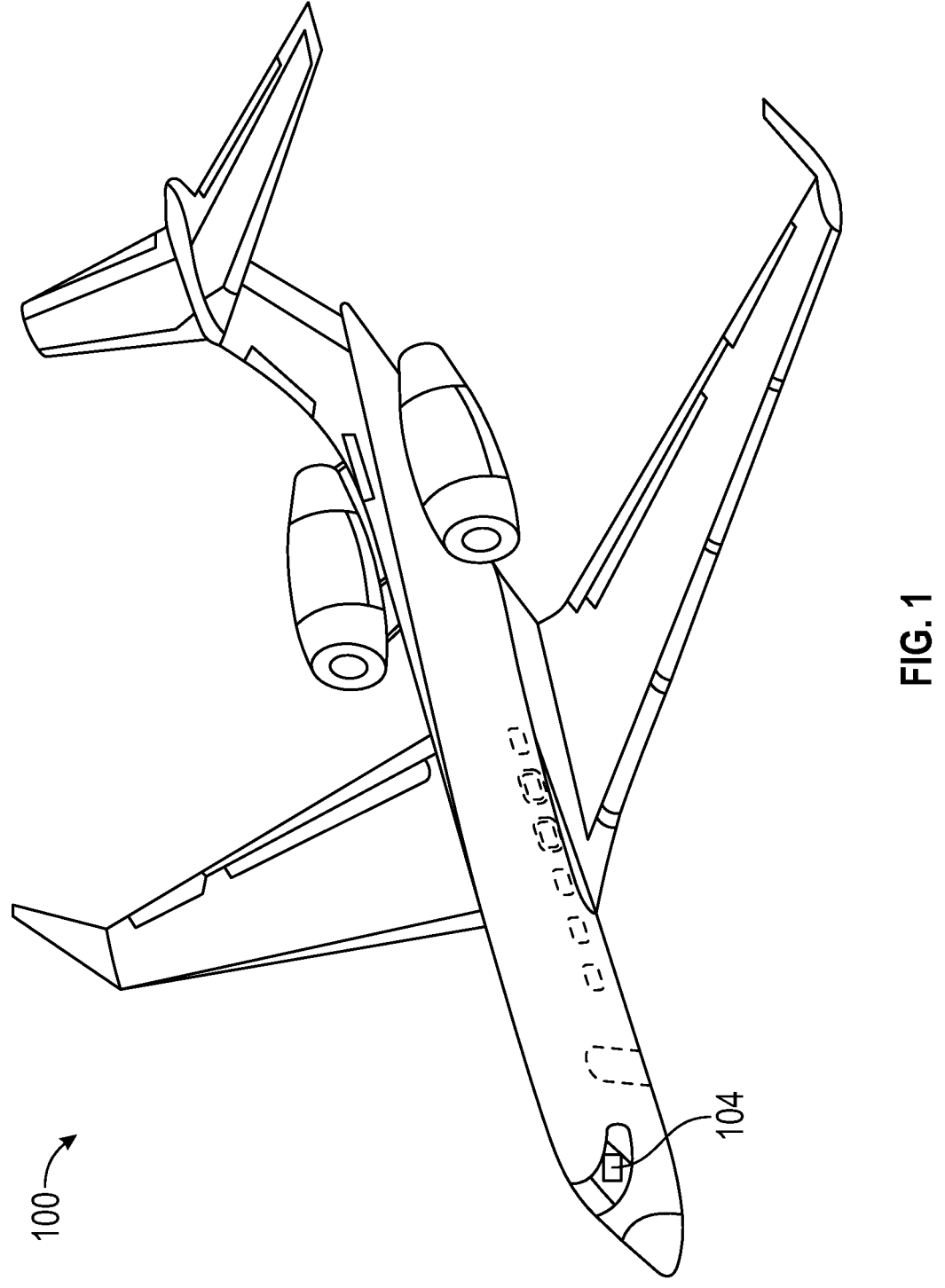
FIG. 1 is a diagram that depicts an aircraft in flight.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to signal processing, aircraft control systems, aircraft service systems, aircraft communication systems, data transmission, signaling, network control, natural language processing, machine learning, artificial intelligence, neural networks, digital animation, artificial computer-generated lifeforms, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Certain vehicle-based communication, display, and control systems, and their related operating methodologies, are disclosed herein. In accordance with certain non-limiting embodiments, the system is deployed onboard an aircraft such as an airplane. However, it should be appreciated that embodiments of the disclosed system can be utilized for other vehicle applications including, without limitation: trains; helicopters; automobiles; watercraft; monorails; amusement park rides; transportation systems; ski lifts; or the like.

FIG. 1 is a diagram that depicts an aircraft 100 in flight. The aircraft 100 includes or cooperates with one or more onboard aircraft systems 104, which may include various features, components, devices, functions, elements, subsystems, or items, some of which may have at least one adjustable setting, parameter, preference, and/or operation. An onboard aircraft system 104 may include or be implemented as any of the following, without limitation, and in any number of iterations or multiples: a flight control system; a navigation system; an instrumentation system; a display system; an alerting system; a messaging or notification system; a global positioning system (GPS) receiver; various sensor devices or components; a user assistance system; a passenger entertainment system; a cabin lighting system; an HVAC system; an adjustable seating or passenger comfort system; a galley (kitchen) appliance; a plumbing system; a fuel system; a lavatory; a clock/calendar system; a passenger communication system; a window blinds system; a cabin management control system; a computer system or network. FIG. 1 represents the various onboard aircraft systems 104 as a single block, but it should be understood that an embodiment of the aircraft 100 will implement the onboard aircraft systems 104 with a variety of different physical, logical, and computer-implemented components.

Figure 2:
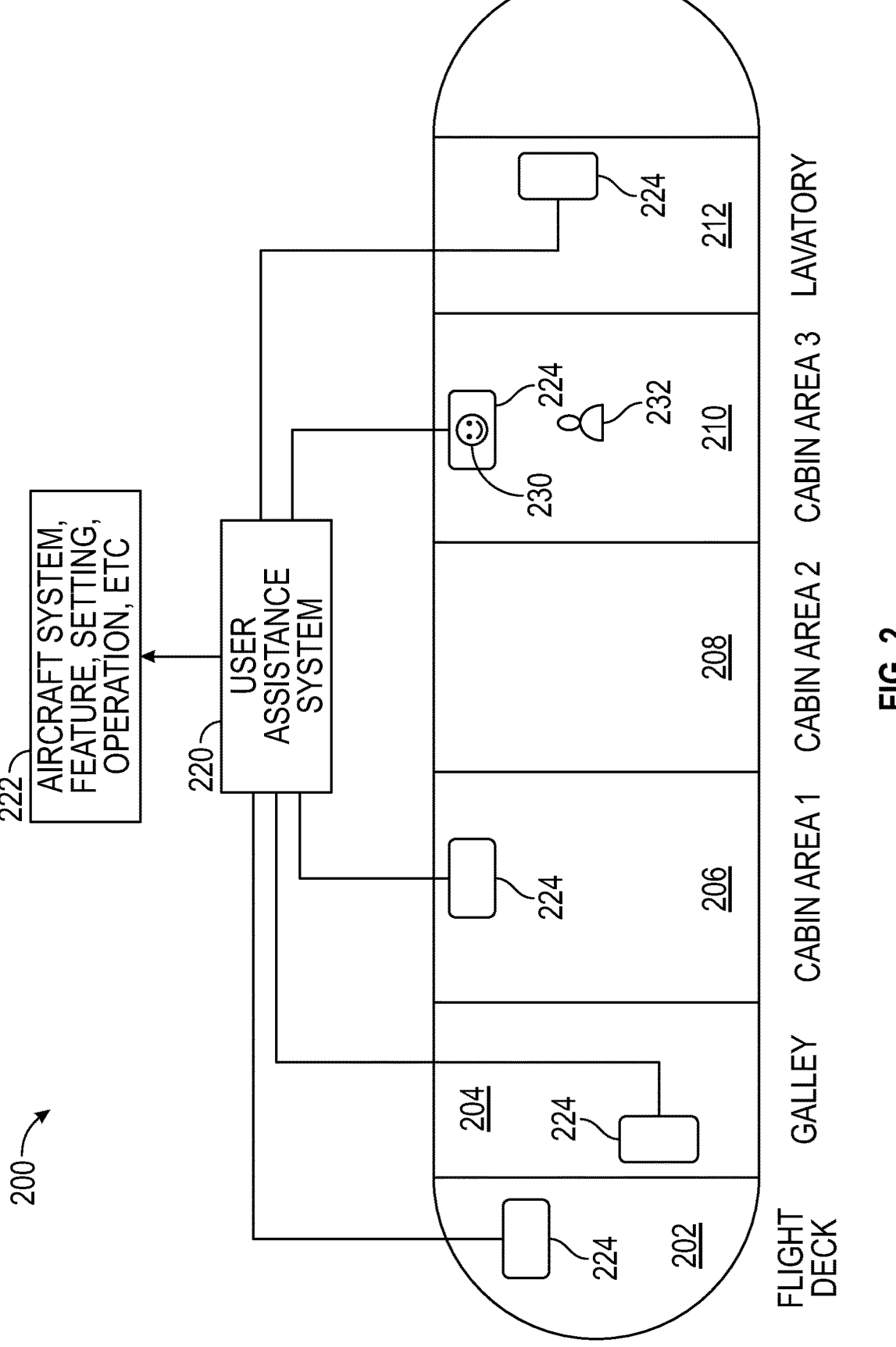
FIG. 2 is a diagram that depicts an exemplary embodiment of an aircraft having different areas or zones defined therein.

FIG. 2 is a diagram that depicts an exemplary embodiment of an aircraft 200 having a plurality of different areas or zones defined therein. The number of areas, arrangement and layout of areas, and intended purpose of each area can vary, depending on the particular deployment and embodiment of the aircraft 200. FIG. 2 merely shows one typical implementation for purposes of this description, and is not intended to limit the scope or application of the described subject matter. The illustrated aircraft 200 includes at least the following areas, zones, or regions: a flight deck 202; a galley 204; a first cabin area 206; a second cabin area 208; a third cabin area 210; and a lavatory 212. Some or all of these different areas can be physically separated with bulkheads, dividing walls, doors, curtains, or the like (although physical separation is not a requirement). The three cabin areas 206, 208, 210 may represent general passenger-occupied areas that accommodate passenger seating, sleeping, dining, or the like. In certain embodiments, different areas or zones onboard the aircraft 200 may have area-specific devices, components, systems, functions, features, operations, actions, settings, and the like. For example, the galley 204 will typically include food preparation and/or food service equipment and features that need not be present in other areas of the aircraft 200. As another example, the flight deck 202 will include various flight control equipment, instrumentation, and systems that need not be present in other areas of the aircraft 200. Moreover, any given cabin area can be customized or configured with user-specific, passenger class specific, and/or group-specific components, features, options, or functions. In this regard, a first class cabin area may include enhanced passenger comfort systems or premium entertainment systems that are not found in a standard class cabin area or in a common living area.

The illustrated embodiment of the aircraft 200 includes at least one computer-implemented user assistance system 220, which may be coupled to communicate with one or more systems, subsystems, features, settings, devices, functions, operations, control parameters, elements, items, or components 222 onboard the aircraft 200. The user assistance system 220 includes or cooperates with artificial intelligence, natural language processing, and artificial human technology to generate, render, and display an animated digital representation of an assistant (preferably in human form, but not always required) on at least one display monitor 224 onboard the aircraft 200. FIG. 2 depicts a state where an artificial human assistant 230 is presented on the display monitor 224 located within the third cabin area 210. For the illustrated scenario, the user assistance system 220 generates, renders, and displays the artificial human assistant 230 in an interactive manner to assist a user 232, to provide information to the user 232, to receive and process information obtained from the user 232, to receive and process commands, control signals, or requests obtained from the user 232, and the like. In accordance with the illustrated example, the artificial human assistant 230 is only presented on the display monitor 224 that is closest to the user 232. In certain scenarios, however, it may be desirable or required to have the artificial human assistant 230 presented on at least one additional display monitor 224. To this end, the user assistance system 220 can be provided with intelligence and logic to determine how best to present the artificial human assistant 230, and how many display monitors 224 to use, for a given situation.

In accordance with preferred implementations, each area or zone of interest onboard the aircraft is supported by at least one respective display monitor 224 of the onboard user assistance system 220. In certain embodiments, however, an area or zone may be void of any display monitors 224. For example, the second cabin area 208 does not include a display monitor 224 and, therefore, users within the second cabin area 208 may not have easy or convenient access to an artificial human assistant. Although not depicted in FIG. 2, the user assistance system 220 may include or cooperate with other components located onboard the aircraft 200. These additional components may include any of the following, without limitation: proximity sensors; motion sensors; microphones; cameras; audio speakers; touchscreen displays; keyboards or keypads; computer input devices (e.g., mouse, joystick, trackball, touchpad).

The user assistance system 220 facilitates user interaction with the various systems, subsystems, features, settings, devices, functions, operations, control parameters, elements, items, or components 222 onboard the aircraft 200. The artificial human assistant 230 serves as a substitute for a live human crew member, and serves as an interface to receive instructions, commands, requests, and questions from users onboard the aircraft 200 (e.g., passengers, flight crew, pilots, maintenance personnel). When appropriate, the user assistance system 220 responds to user instructions, commands, requests, and questions to make adjustments to onboard components 222, to activate onboard components 222, and/or to control features, functions, or operations of the aircraft 200. Accordingly, FIG. 2 depicts the user assistance system 220 in communication with the onboard components 222.

The computer-implemented user assistance system 220 is effective, efficient, reliable, and easy to use. Nonetheless, some passengers or flight crew members may not be completely comfortable using computer-driven systems, especially as more systems and components onboard aircraft become more automated. Accordingly, the user assistance system 220 disclosed here generates an interactive and realistic digital human face that increases user comfort levels and higher acceptance. User acceptance of an artificial human interface increases if the artificial human reacts and responds in a natural and expected manner to speech input, and in the proper context to fit the particular scenario.

Figure 3:
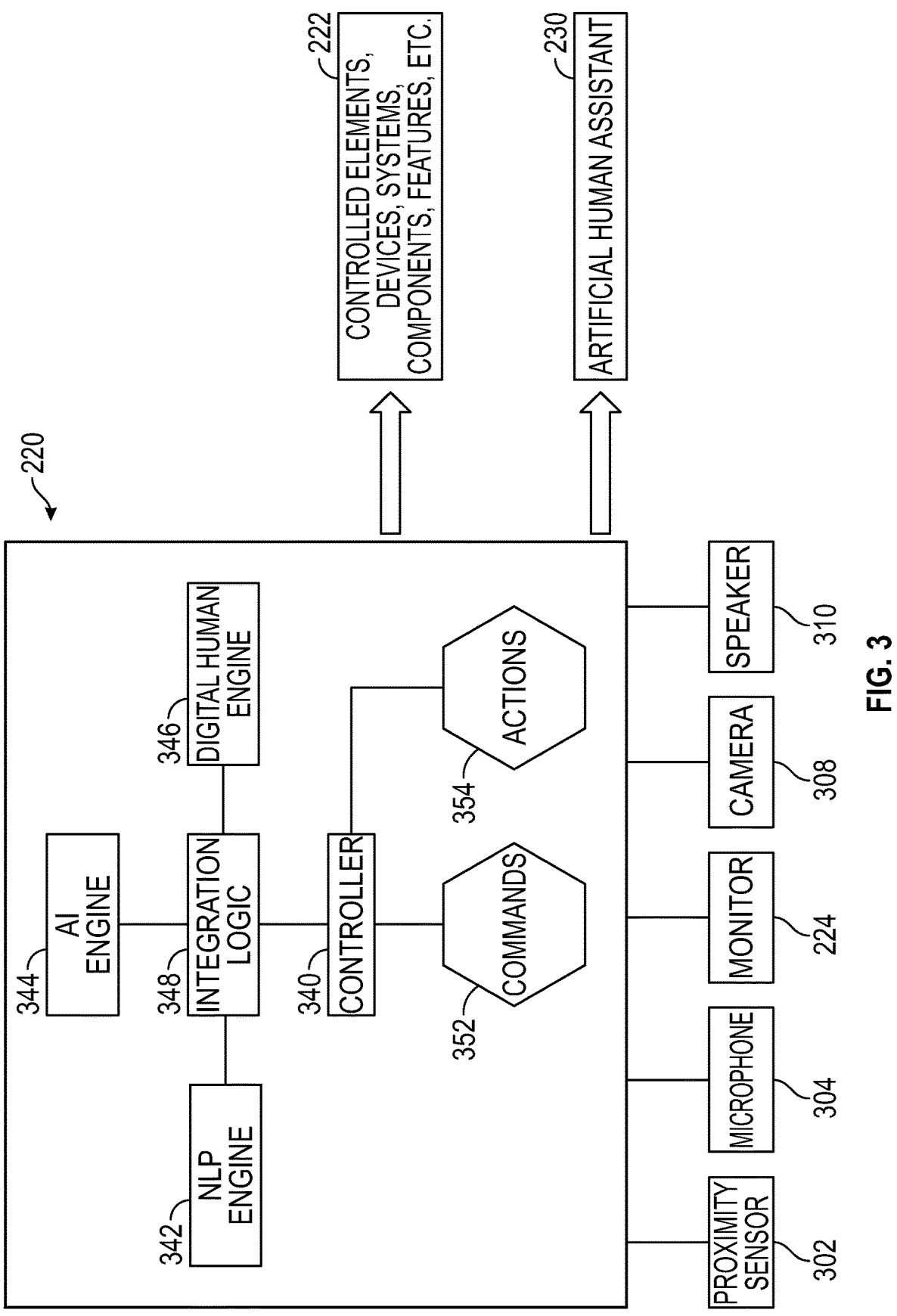
FIG. 3 is a simplified block diagram representation of an automated user assistance system that is configured in accordance with an exemplary embodiment of the invention.

FIG. 3 is a simplified block diagram representation of the automated user assistance system 220 shown in FIG. 2, which is configured in accordance with an exemplary embodiment of the invention. FIG. 3 also includes other items depicted in FIG. 2: the various controlled elements, devices, systems, features, functions, and components 222 onboard the aircraft 200; one display monitor 224; and the artificial human assistant 230. As mentioned above, the user assistance system 220 may include or cooperate with any number of input/output devices as needed or desired for the particular implementation, including, without limitation: at least one proximity sensor 302; at least one microphone 304; at least one camera 306; at least one speaker 310; and/or other sensors, feedback devices, or the like. In certain embodiments, each area or zone of the aircraft 200 that is supported by the user assistance system 220 includes at least one display monitor 224, at least one proximity sensor 302, at least one microphone 304, and at least one speaker 310. Although not always required, each area or zone of the aircraft that is supported by the user assistance system 220 may also include at least one camera 308.

An aircraft, such as the aircraft 100, 200, may have any number of proximity sensors 302 installed throughout the various areas and zones onboard the aircraft. Each proximity sensor 302 is configured to detect the presence of users within a particular area of the aircraft. More specifically, a given proximity sensor 302 is intended to detect the presence of users within a respective area that is supported by the automated user assistance system 220. In certain embodiments, each proximity sensor 302 is located near a display monitor 224 such that the automated user assistance system 220 can detect when a user is close enough to interact with an artificial human displayed on that display monitor 224. A proximity sensor 302 can be implemented using one or more sensor technologies, such that output of the proximity sensor 302 can be processed or monitored to determine whether or not a user is nearby. In this regard, a proximity sensor 302 may employ capacitive, magnetic, inductive, optical, ultrasonic, thermal, and/or other technologies.

An aircraft, such as the aircraft 100, 200, may have any number of microphones 304 installed throughout the various areas and zones onboard the aircraft. Each microphone 304 captures sound within a particular area of the aircraft. More specifically, a given microphone 304 is intended to capture voice/speech of users within a respective area that is supported by the automated user assistance system 220. In certain embodiments, each microphone 304 is located near a display monitor 224 such that the automated user assistance system 220 can obtain and process speech commands when a user is close enough to interact with an artificial human displayed on that display monitor 224.

An aircraft, such as the aircraft 100, 200, may have any number of cameras 308 installed throughout the various areas and zones onboard the aircraft. Each camera 308 captures image data (still pictures and/or video) for a particular area of the aircraft. More specifically, a given camera 308 is intended to capture pictures and/or video of users within a respective area that is supported by the automated user assistance system 220. In certain embodiments, each camera 308 is located near a display monitor 224 such that the automated user assistance system 220 can capture and process images and/or video of a user who is interacting with an artificial human displayed on that display monitor 224. The image data captured by a camera 308 can be processed to determine or estimate one or more characteristics or traits of the user, such as: identity; state or condition; gender; age; height; weight.

An aircraft, such as the aircraft 100, 200, may have any number of speakers 310 installed throughout the various areas and zones onboard the aircraft. Each speaker 310 emits sound within a particular area of the aircraft. More specifically, a given speaker 310 is intended to generate sound for users within a respective area that is supported by the automated user assistance system 220. In certain embodiments, each speaker 310 is located near a display monitor 224 such that the automated user assistance system 220 can generate computer-synthesized speech for an artificial human displayed on that display monitor 224.

For simplicity and ease of description, FIG. 3 depicts the proximity sensor 302, the microphone 304, the display monitor 224, the camera 308, and the speaker 310 as distinct and separate blocks. In practice, however, any number of these components can be combined or integrated into a common device or platform. For example, a display monitor 224 can be implemented such that it also includes the proximity sensor 302, the microphone 304, the camera 308, and/or the speaker 310 in a single housing or physical structure.

The automated user assistance system 220 is implemented using a computer-based architecture having at least one processor and at least one processor-readable medium associated with the at least one processor. The at least one processor-readable medium stores processor-executable instructions configurable to be executed by the at least one processor to perform automated methods of controlling a component onboard the aircraft, as described in more detail below. Accordingly, the automated user assistance system 220 can be programmed, configured, and operated to provide certain logic, functional modules, processing engines, and intelligence that supports the various techniques and methodologies described here. To this end, FIG. 3 schematically depicts certain aspects of the automated user assistance system 220 in the form of interconnected blocks. The illustrated embodiment includes, without limitation: at least one controller 340; a natural language processing (NLP) engine 342; an artificial intelligence (AI) engine 344; a digital human engine 346; and integration logic 348.

In FIG. 3, each engine 342, 344, 346 represents the processing power and computer-driven logic related to its respective function. Accordingly, the NLP engine 342 is responsible for performing various NLP tasks that support the functionality of the automated user assistance system 220, the AI engine 344 is responsible for performing various AI tasks that support the functionality of the system 220, and the digital human engine 346 is responsible for performing various digital animation, artificial human simulation, and digital image processing tasks that support the generation, creation, and display of the artificial human assistant 230. In certain embodiments, the NLP engine 342 may include or leverage available NLP technology, such as the GPT-3 product from OPENAI. In certain embodiments, the AI engine 344 may include or leverage available AI modeling technology, evolutionary computing algorithms, machine learning technology, neural network technology, and the like. In certain embodiments, the digital human engine 346 may include or leverage available digital human technology, such as the NEON technology from SAMSUNG or the METAHUMAN CREATOR product from UNREAL ENGINE.

The integration logic 348 communicates with or cooperates with the NLP engine 342, the AI engine 344, the digital human engine 346, and the controller 340 as needed to control the behavior of the artificial human assistant 230 and the manner in which it is rendered and displayed. The integration logic 348 also communicates or cooperates with the other elements of the automated user assistance system 220 to interpret speech input (and/or other forms of user input), process commands 352 that are extracted from speech input, and initiate or carry out certain actions 354 onboard the host aircraft. More specifically, the actions 354 correspond to functions, features, or operations of the components 222 onboard the aircraft that can be controlled by the automated user assistance system 220. In certain embodiments, the automated user assistance system 220 includes or cooperates with at least one area-specific library of actions 354 that can be identified using the NLP engine 342. This enables the system 220 to carry out different actions 354 onboard the aircraft, depending on where the user is currently located (e.g., which area or zone of the aircraft and/or a specific location within an area or zone). In certain embodiments, the automated user assistance system 220 includes or cooperates with at least one user-specific library of actions 354 that can be identified using the NLP engine 342. This enables the system 220 to carry out different actions 354 onboard the aircraft, depending on which user is currently interacting with the system 220. In certain embodiments, the automated user assistance system 220 includes or cooperates with at least one flight status specific library of actions 354 that can be identified and processed as needed. This enables the system 220 to carry out different actions 354 onboard the aircraft, depending on the current flight status, flight data, and/or operating status of the aircraft.

The automated user assistance system 220 is configured and operated such that the AI engine 344 cooperates with the NLP engine 342 to influence the behavior of an animated digital representation of an assistant (e.g., the artificial human assistant 230). Furthermore, the automated user assistance system 220 is configured and operated such that the digital human engine 346 cooperates with the NLP engine 342 to influence the behavior of the artificial human assistant 230.

Figure 4:
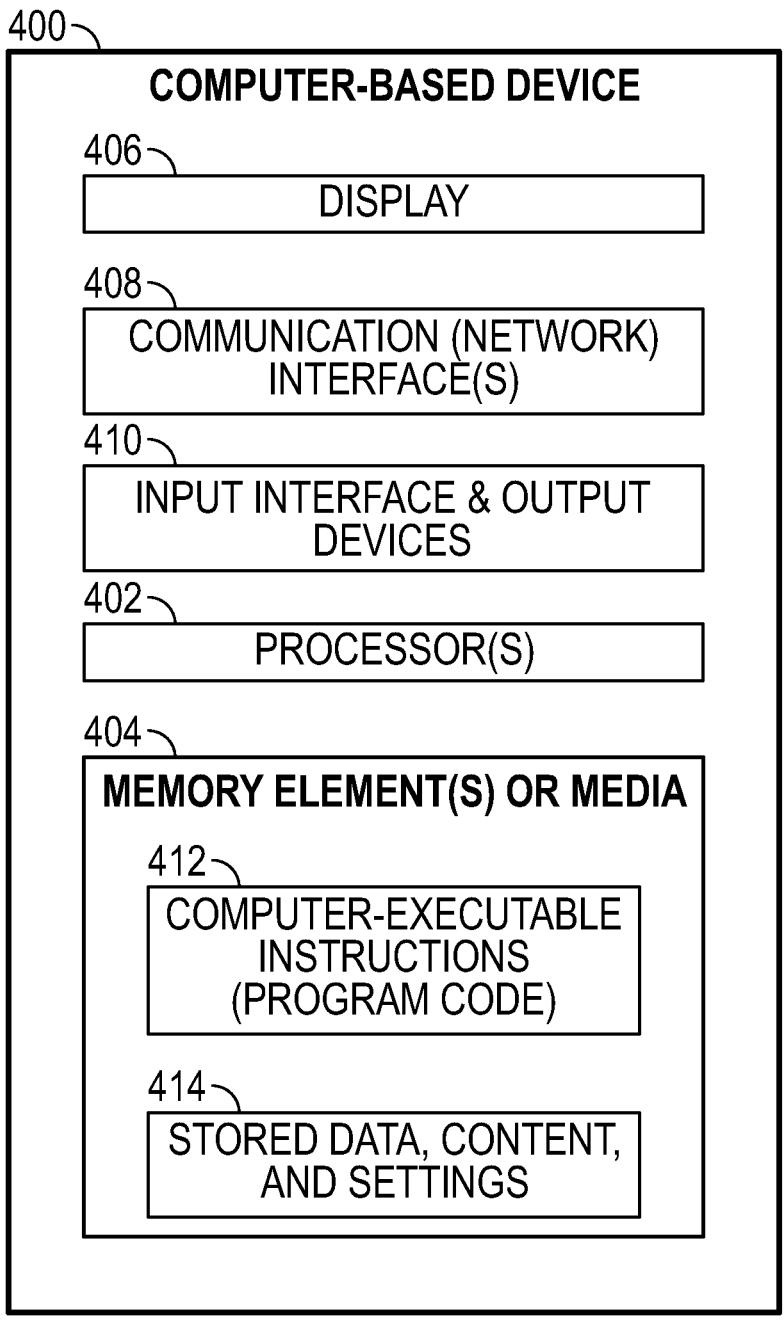
FIG. 4 is a block diagram of an exemplary embodiment of a computer-based device.

In accordance with certain embodiments, an aircraft system 104 depicted in FIG. 1, and certain items depicted in FIG. 2 and FIG. 3 can be implemented as at least one computer-based or a processor-based device, system, or piece of equipment. In this regard, FIG. 4 is a simplified block diagram representation of an exemplary embodiment of a computer-based device 400, which may be used to implement certain devices or systems onboard the aircraft 100, 200.

The device 400 generally includes, without limitation: at least one processor 402; at least one memory storage device, storage media, or memory element 404; a display 406; at least one communication (network) interface 408; and input and output (I/O) devices 410, such as an input interface, one or more output devices, one or more human/machine interface elements, or the like. In practice, the device 400 can include additional components, elements, and functionality that may be conventional in nature or unrelated to the particular application and methodologies described here.

A processor 402 may be, for example, a central processing unit (CPU), a field programmable gate array (FPGA), a microcontroller, an application specific integrated circuit (ASIC), or any other logic device or combination thereof. One or more memory elements 404 are communicatively coupled to the at least one processor 402, and can be implemented with any combination of volatile and non-volatile memory. The memory element 404 has non-transitory machine-readable and computer-executable instructions (program code) 412 stored thereon, wherein the instructions 412 are configurable to be executed by the at least one processor 402 as needed. When executed by the at least one processor 402, the instructions 412 cause the at least one processor 402 to perform the associated tasks, processes, and operations defined by the instructions 412. Of course, the memory element 404 may also include instructions associated with a file system of the host device 400 and instructions associated with other applications or programs. Moreover, the memory element 404 can serve as a data storage unit for the host device 400. For example, the memory element 404 can provide storage 414 for aircraft data, navigation data, sensor data, measurements, image and/or video content, settings or configuration data for the aircraft, and the like.

The display 406 (if deployed with the particular embodiment of the device 400) may be integrated with the device 400 or communicatively coupled to the device 400 as a peripheral or accessory component. The shape, size, resolution, and technology of the display 406 will be appropriate to the particular implementation of the device 400. The display 406 can be realized as a monitor, touchscreen, or another conventional electronic display that is capable of graphically presenting data and/or information provided by the device 400.

The communication interface 408 represents the hardware, software, and processing logic that enables the device 400 to support data communication with other devices. In practice, the communication interface 408 can be suitably configured to support wireless and/or wired data communication protocols as appropriate to the particular embodiment. For example, the communication interface 408 can be designed to support an aircraft network protocol, a cellular communication protocol, a short-range wireless protocol (such as the BLUETOOTH communication protocol), and/or a WLAN protocol. As another example, if the device 400 is a desktop or laptop computer, then the communication interface can be designed to support the BLUETOOTH communication protocol, a WLAN protocol, and a LAN communication protocol (e.g., Ethernet). In accordance with certain aircraft applications, the communication interface 408 is designed and configured to support one or more onboard network protocols used for the communication of information between devices, components, and subsystems of the aircraft 100, 200.

The I/O devices 410 enable the user of the device 400 to interact with the device 400 as needed. In practice, the I/O devices 410 may include, without limitation: an input interface to receive data for handling by the device 400; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 406 can be categorized as an I/O device 410. Moreover, a touchscreen display 406 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

As mentioned above, the aircraft 100, 200 includes an onboard automated user assistance system 220 that leverages digital human, natural language processing, and artificial intelligence technologies to provide reactive and responsive assistance to passengers and/or flight crew members. The system 220 uses the display monitors 224 in the flight deck, galley, cabin, and/or other areas onboard the aircraft 100, 200 to display the artificial human assistant 230. The users can interact with the displayed artificial human assistant 230 via voice commands, questions, and requests. In this manner, interaction with the artificial human assistant 230 is akin to a video conference with live support personnel, and can serve as a substitute for actual face-to-face interaction with live support personnel. The system 220 allows the user to control certain functions, operations, or features of the aircraft 100, 200 (e.g., passenger comfort features, flight deck operating commands, service requests). In certain embodiments, the system 220 is programmed, configured, and operated to obtain aircraft status information (e.g., from a pilot) and respond in an appropriate manner to control flight parameters of the aircraft, adjust settings, take corrective or preventative action, or the like.

Deployment of the system 220 can, therefore, reduce the workload and fatigue of the flight crew, reduce the amount of multitasking required of the flight crew, and increase passenger convenience and comfort. Moreover, deployment of the system 220 can reduce operating costs by reducing the need for flight crew personnel in the passenger cabin and/or to reduce the number of flight deck personnel needed to operate the aircraft.

Figure 5:
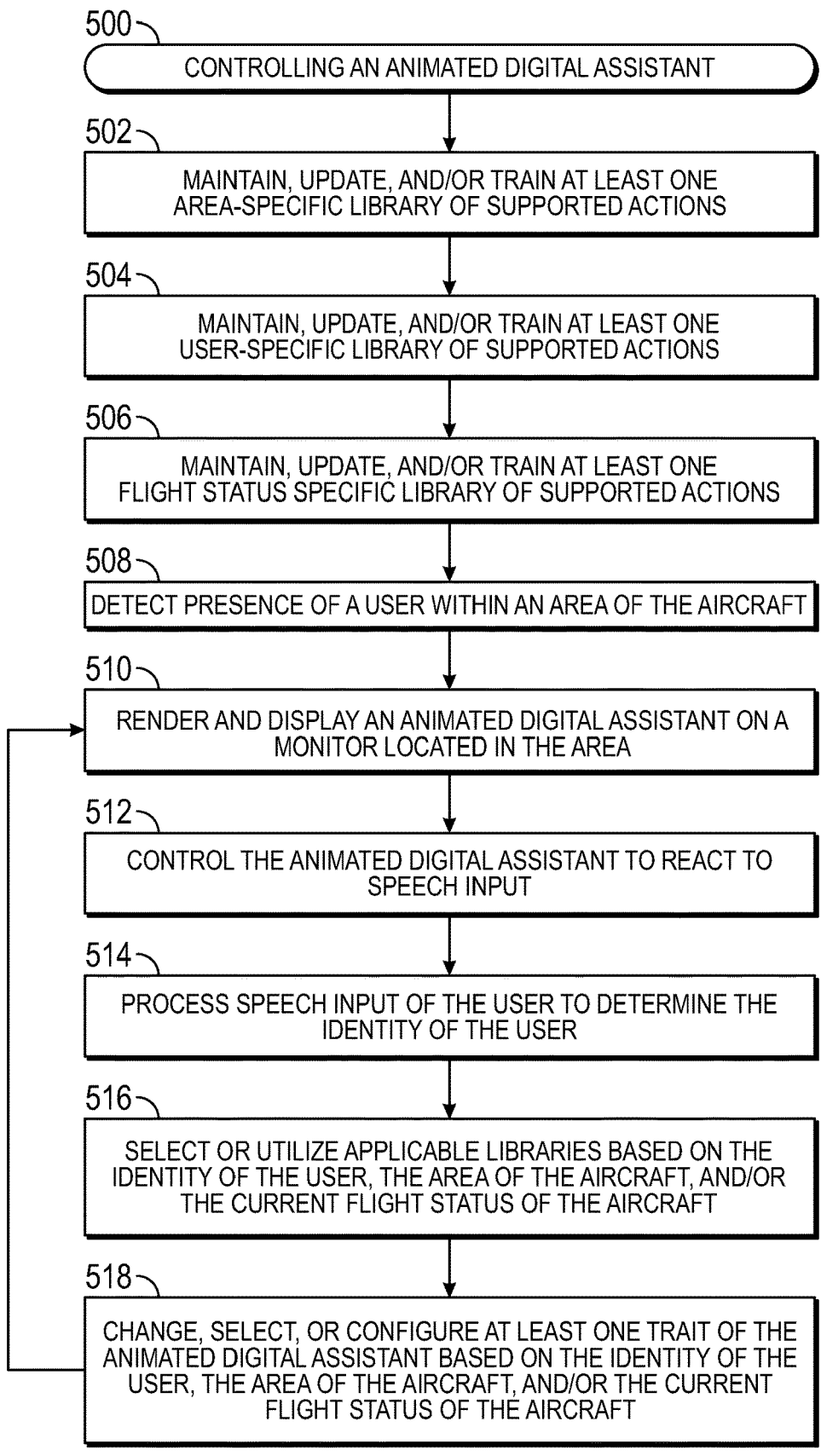
FIG. 5 is a flow chart that illustrates an exemplary embodiment of a process for controlling an animated digital assistant.

FIG. 5 is a flow chart that illustrates an exemplary embodiment of a process 500 for controlling an animated digital assistant, and FIG. 6 is a flow chart that illustrates an exemplary embodiment of a process 600 for controlling a component, system, feature, setting, or operation of an aircraft. The various tasks performed in connection with a depicted process may be performed by software, hardware, firmware, or any combination thereof. For illustrative purposes, the following description may refer to elements mentioned above in connection with FIGS. 1-4. In practice, portions of a described process may be performed by different elements of the described system, e.g., a sensor, a display element, a computer system, or the like. It should be appreciated that an illustrated process may include any number of additional or alternative tasks, the tasks shown in a figure need not be performed in the illustrated order, and an illustrated process may be incorporated into a more comprehensive procedure or process having additional functionality not described in detail herein. Moreover, one or more of the tasks shown in a figure could be omitted from an embodiment of the depicted process as long as the intended overall functionality remains intact.

Referring to FIG. 5, the process 500 assumes that a suitably configured automated user assistance system 220 of the type described above has already been deployed and activated onboard the host vehicle, e.g., an aircraft. Moreover, this example assumes that various databases, libraries, and/or preferences have already been configured, saved, or recorded. A library of supported actions includes various actions that can be determined or identified in an automated manner by the system 200, such that supported actions onboard the aircraft can be initiated in response to user interaction with the artificial human assistant. A library of supported commands includes various commands that can be detected or identified in an automated manner by the system 220, such that supported commands can be interpreted, executed, or otherwise carried out in response to user interaction with the artificial human assistant.

In accordance with certain embodiments, the process 500 can maintain, update, and/or train at least one area-specific library of actions (and/or commands) that are supported by the system (task 502). Accordingly, each defined area of the aircraft (see FIG. 2) may have its own area-specific library of actions/commands that are appropriate, suitable, and relevant for that particular area. For example, the library of supported actions for the galley 204 may include various food and beverage service actions that are irrelevant or inapplicable in other areas onboard the aircraft. As another example, the library of supported actions for the first cabin area 206 may include actions related to the cabin lighting, HVAC system, and seating systems—actions that may be irrelevant or inapplicable in the lavatory 212. Area-specific actions can also be defined or assigned to specific locations, regions, positions, or objects within a given area or zone. Accordingly, information obtained from the proximity sensors 302 onboard the aircraft can be utilized to determine where the user is located, and what objects, devices, systems, or features are near or in contact with the user, and the resulting area or location information can be used to provide customized, specialized, or more contextually relevant support for the user. For example, the system 220 can react in a location-appropriate manner, based on the determined location of the user (e.g., sitting at a table, standing at the bar, reclined in a seat, on a bed or other flat surface, sitting in a window seat, standing near the food preparation area of the galley).

The artificial human assistant can be programmed and controlled to recognize generic or universal actions/commands versus area-specific actions/commands. Moreover, the artificial human assistant can be programmed and controlled to respond in an appropriate manner when users request or attempt to initiate activities that cannot be executed in a particular area of the aircraft.

In accordance with certain embodiments, the process 500 can maintain, update, and/or train at least one user-specific library of actions (and/or commands) that are supported by the system (task 504). Accordingly, each individual user (and/or each defined class or group of users) may have their own user-specific library of actions/commands that are appropriate, suitable, and relevant for that particular user, class, or group. For example, the library of supported actions for an individual user may reflect that user's preferences, security clearance, system permissions, profile data, demographic data, or the like. As another example, the library of supported actions for a class of users may reflect class-specific options, priorities, benefits, security clearance, system permissions, or the like. The system 220 can be programmed and controlled to recognize and identify individual users and/or to determine any group or class affiliations. Moreover, the artificial human assistant can be programmed and controlled to respond in an appropriate manner based on the identity of the user and/or the user's class or group affiliation.

In accordance with certain embodiments, the process 500 can maintain, update, and/or train at least one flight status specific library of actions (and/or commands) that are supported by the system (task 506). Accordingly, different libraries can be used for different stages of a flight plan and/or for different operating states of the aircraft. For example, one library of supported actions can be utilized when the aircraft is grounded and stationary, a different library of supported actions can be utilized when the aircraft is taxiing, and yet another library of supported actions can be utilized when the aircraft is flying at the normal cruising altitude and speed. The system 220 can be programmed and controlled to respond in an appropriate manner based on the current flight status of the aircraft to ensure that appropriate actions and commands are processed.

The libraries of actions/commands can be initially populated with any number of common, generic, default, and/or universal actions and commands, as appropriate to the particular implementation and deployment of the system 220 (e.g., lighting on/off, window shades open/closed, climate control settings, basic audiovisual system controls). In certain embodiments, one or more libraries can be populated (initially, or via subsequent uploading by maintenance personnel) with custom, user-specific, application-specific, aircraft-specific, and/or flight-specific actions and commands. Accordingly, the system 220 can be specifically tailored to suit the needs and specifications of particular passengers, aircraft operators, the flight plan, the departure or destination locations, or the like. In certain embodiments, the system 220 can be adaptively trained, customized, and/or modified in an ongoing manner to personalize and update any or all of the specific libraries as needed or desired. In other words, the libraries can be revised (automatically or manually) over time to contemplate changes, to support new features or functions onboard the aircraft, to service new users, and the like.

The example described here assumes that the aircraft includes proximity sensors 302 in different areas of the aircraft. The process 500 uses the proximity sensors 302 to detect the presence of a user within a particular area of the aircraft (task 508), wherein the particular area is supported by at least one display monitor 224 of the user assistance system 220. In certain implementations, the presence of the user is detected based on an output of a proximity sensor 302 that is located at or near one of the display monitors 224. The use of multiple proximity sensors 302 enables the system 220 to activate or "wake up" an artificial human assistant on the appropriate display monitor 224, such that the user can be greeted by the assistant soon after the user arrives near that display monitor 224. Upon detection of the user, the system 220 may record or identify the particular area for purposes of distinguishing that area from other areas or zones onboard the aircraft. In response to the detection of the user, the process 500 continues by rendering and displaying an animated digital representation of an assistant on a display monitor 224 that is located near the user (task 510). As mentioned above, the system 220 employs digital human technology and causes the generation and display of an animated and lifelike artificial human on the display monitor 224. Although this description primarily refers to the use of an animated digital human, the digital assistant that is presented to the user may be non-human in form, e.g., an animated monster, a digitized animal, an animated tree, an object or icon, etc.

The process 500 controls the animated digital assistant in an appropriate manner to react to the user's speech input, as detected by the system 220 (task 512). The NLP engine 342 (see FIG. 3) enables the system 220 to receive, parse, and analyze the user's speech input such that behavior or characteristics of the animated digital assistant can be dynamically and reactively controlled and adjusted in a realistic manner. In certain embodiments, the speech input of the user is processed to determine the identity of the user (task 514), which in turn can be used to determine, identify, or retrieve other information or data related to that user (e.g., group affiliation, user class or category, security settings, priorities, benefits, profile data, user preferences, travel plans).

In accordance with certain embodiments, the process 500 selects or utilizes applicable libraries based on: the identity of the user; the particular area of the aircraft in which the user was detected; and/or the current flight or operating status of the aircraft (task 516). As mentioned above, the system 220 can maintain user-specific libraries of actions, area-specific libraries of actions, and flight status specific libraries of actions. Accordingly, task 516 may involve the selection or accessing of currently applicable and relevant libraries to use in an ongoing manner. In addition, the process 500 may change, select, or configure at least one trait or behavioral characteristic of the animated digital assistant, based on the determined identity of the user, the particular area of the aircraft, and/or the current flight status of the aircraft (task 518). For example, it may be desirable to change the behavior, appearance, personality, voice, mannerisms, gender, age, and/or other discernable characteristics of the animated digital assistant in an area-specific manner or on a user-by-user basis. Adaptive modifications to the animated digital assistant can result in higher acceptance and increased user trust and comfort when interacting with the system 220.

Referring to FIG. 6, the following description of the process 600 assumes that the system 220 has already activated and generated an appropriate artificial human assistant to interact with a user located within a defined area of the aircraft. To this end, the process 600 displays the animated digital assistant on at least one display monitor located within the particular area of the aircraft (task 602). The process 600 may continue by processing speech input of the user using, for example, the NLP engine 342 (task 604). The speech input can be parsed, analyzed, and reviewed to identify or extract at least one action to be carried out onboard the aircraft (task 606). This example assumes that the process 600 successfully identifies at least one action that can be initiated, executed, or started. Accordingly, the process 600 continues by controlling the animated digital representation of the assistant to respond to the identified action(s) in an appropriate, realistic, and natural manner (task 608). If applicable, the process 600 issues at least one command, instruction, or control signal to an appropriate component (or components) onboard the aircraft, to initiate, activate, trigger, or start the identified action or actions (task 610). In this way, the artificial human assistant can serve as an interface between the user and the control systems onboard the aircraft. The digital assistant can: greet the user; ask questions; listen for requests, commands, instructions, or questions from the user; respond to the user by providing answers, providing information, or obtaining data or content; confirm or acknowledge instructions received from the user; and initiate appropriate actions that are directly in response to speech input obtained from the user.

As described previously, the methodology encompassed by tasks 602, 604, 606, 608, and 610 is carried out in an automated fashion such that the artificial human assistant reacts and responds in a natural and realistic manner while interacting with the user. To this end, the process 600 can control the behavior, appearance, and communication of the artificial human assistant in an area-specific manner, a user-specific manner, and/or a flight status specific manner to enhance the user experience.

Alternatively or additionally, the process 600 can obtain, generate, access, and/or present information or data to the user in an independent manner, i.e., without any user input or instruction. In certain embodiments, the process 600 monitors the flight status or operating status of the aircraft during flight, while grounded, while taxiing, etc. (task 612). Task 612 may monitor the current flight plan status, operating parameters of the aircraft, the current geographical location of the aircraft, current flight data, and the like. The monitored information can be used to control the animated digital representation of the assistant to provide information that is contextually relevant to the monitored state, condition, status, or information. Accordingly, the current flight status (including geographical location) can be monitored in an ongoing manner such that the digital assistant can provide interesting information or content related to the current geographical location. For example, if the aircraft is flying over a popular landmark, the digital assistant can be activated to inform the passengers and to give a brief speech about that landmark. As another example, the digital assistant can be activated to let passengers know that a meal will be served soon, and to obtain food and drink orders from the passengers.

EXAMPLES

The system 220 can be configured, programmed, and operated to support a wide variety of actions, operations, commands, and the like. The following examples demonstrate some practical functionality, and are not intended to be limiting of the scope or application of the disclosed subject matter. It should be appreciated that a vast number of additional or alternative features, functions, and operations can be supported by an embodiment of the system 220.

Example 1 (Setting Alarms)—if the user asks for an alarm, the artificial human assistant responds with: "You usually ask to transition the lights to a warmer hue when you wake up. Would you like me to do that for you when your alarm goes off?"

Example 2 (Media Content)—if the user typically reads or requests particular media sources for news, financial information, sports updates, or the like, the artificial human assistant can monitor those media sources, and automatically announce updates to the user.

Example 3 (Meal Time)—if the user customarily eats lunch at a regular time, the artificial human assistant can automatically activate, provide a reminder, present a menu to the user, ask the user whether they would like the crew to start preparing lunch, and/or notify the crew of the user's request.

Example 4 (Custom Voice Control)—the system can recognize who is speaking and respond in a user-specific manner to regulate and restrict access to certain features, functions, and operations onboard the aircraft based on user identity.

Example 5 (Points of Interest)—if the aircraft is flying over a landmark, the artificial human assistant notifies the user and says: "If you look out the right side windows, you will see a famous landmark." If applicable, the artificial human assistant can also respond with: "I found some vacation photos of your visit to this famous landmark. Would you like me to display them?"

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated method of controlling a component onboard an aircraft, the method comprising:

providing user-specific libraries of actions that can be performed for members of a flight crew and user-specific libraries of actions that can be performed for passengers, where the user-specific libraries of actions that can be performed for members of the flight crew include at least one different action from the user-specific libraries of actions that can be performed for the passengers;

providing area-specific libraries of actions that can be performed for users in each of a plurality of areas of the aircraft, where the plurality of areas includes at least one cabin area and at least one galley area, where the area-specific libraries of actions that can be performed for users in the at least one galley area include at least one different action from the area-specific libraries of actions that can be performed for users in the at least one cabin area;

detecting presence of a user within one of the plurality of areas of the aircraft supported by a display monitor of an onboard user assistance system, wherein the detecting is based on output of a proximity sensor;

determining if the detected presence of the user corresponds to a member of the flight crew or a passenger;

in response to the detecting, causing display of an animated digital representation of an assistant on the display monitor;

controlling the animated digital representation of the assistant to react to speech input;

processing speech input of the user with a natural language processing engine to identify at least one action in a selected one of the user-specific libraries of actions and the area-specific libraries of actions to be carried out onboard the aircraft, where the selected one of the user-specific libraries of actions and the area-specific libraries of actions corresponds to the user being a member of the flight crew or being a passenger and/or to the user being in the at least one cabin area or in the at least one galley area;

controlling the animated digital representation of the assistant to respond to the identified at least one action in the selected one of the user-specific libraries of actions and the area-specific libraries of actions; and issuing at least one command, instruction, or control signal to the component onboard the vehicle, to initiate the identified at least one action in the selected one of the user-specific library of actions and the area-specific libraries of actions.

2. The method of claim 1, wherein the animated digital representation of the assistant comprises an artificial digital human.

3. The method of claim 1, wherein:

each of the plurality of areas is supported by a respective display monitor of the onboard user assistance system.

4. The method of claim 3, wherein the area-specific library of actions can be identified with the natural language processing engine.

5. The method of claim 4, further comprising:

changing at least one trait of the animated digital representation of the assistant in an area-specific manner.

6. The method of claim 1, wherein:

the determining if the detected presence of the user corresponds to a member of the flight crew or a passenger comprises processing the speech input of the user to determine an identity of the user.

7. The method of claim 6, further comprising:

adaptively training the onboard user assistance system to personalize and update the user-specific libraries of actions over time.

8. The method of claim 1, further comprising:

monitoring operating status of the aircraft; and controlling the animated digital representation of the assistant to provide information that is contextually relevant to the operating status.

9. The method of claim 1, further comprising:

processing the speech input of the user to determine an identity of the user; and selecting at least one trait of the animated digital representation of the assistant based on the determined identity of the user.

10. A user assistance system onboard an aircraft, the system comprising:

a plurality of proximity sensors configured to detect presence of users within one of a plurality of areas of the aircraft, where the plurality of areas includes at least one cabin area and at least one galley area;

a display monitor located within one of the plurality of areas;

at least one processor; and at least one processor-readable medium associated with the at least one processor, the at least one processor-readable medium storing processor-executable instructions configurable to be executed by the at least one processor to perform an automated method of controlling a component onboard the aircraft, the method comprising:

providing user-specific libraries of actions that can be performed for members of a flight crew and user-specific libraries of actions that can be performed for passengers, where the user-specific libraries of actions that can be performed for members of the flight crew include at least one different action from the user-specific libraries of actions that can be performed for the passengers;

providing area-specific libraries of actions that can be performed for users in each of a plurality of areas of the aircraft, where the area-specific libraries of actions that can be performed for users in the at least one galley area include at least one different action from the area-specific libraries of actions that can be performed for users in the at least one cabin area;

detecting a presence of a user within one of the plurality of areas of the aircraft, wherein the detecting is based on output of one of the plurality of proximity sensors;

determining if the detected presence of the user corresponds to a member of the flight crew or a passenger;

in response to the detecting, causing display of an animated digital representation of an assistant on the display monitor;

controlling the animated digital representation of the assistant to react to speech input;

processing speech input of the user with a natural language processing engine to identify at least one action in a selected one of the user-specific libraries of actions and the area-specific libraries of actions to be carried out onboard the aircraft, where the selected one of the user-specific libraries of actions and the area-specific libraries of actions corresponds to the user being a member of the flight crew or being a passenger and/or to the user being in the at least one cabin area or in the at least one galley area;

controlling the animated digital representation of the assistant to respond to the identified at least one action in the selected one of the user-specific libraries of actions and the area-specific libraries of actions; and issuing at least one command, instruction, or control signal to the component onboard the aircraft, to initiate the identified at least one action in the selected one of the user-specific library of actions and the area-specific libraries of actions.

11. The system of claim 10, wherein:

each of the plurality of areas is supported by a respective display monitor of the onboard user assistance system; and the area-specific library of actions can be identified with the natural language processing engine.

12. The system of claim 11, wherein the method performed by the at least one processor further comprises: changing at least one trait of the animated digital representation of the assistant in an area-specific manner.

13. The system of claim 10, wherein the method performed by the at least one processor further comprises:

monitoring flight status of the aircraft; and controlling the animated digital representation of the assistant to provide information that is contextually relevant to the flight status.

14. The system of claim 10, wherein:

the determining if the detected presence of the user corresponds to a member of the flight crew or a passenger comprises processing the speech input of the user to determine an identity of the user; and selecting at least one trait of the animated digital representation of the assistant based on the determined identity of the user.

15. The system of claim 10, further comprising:

an artificial intelligence engine that cooperates with the natural language processing engine to influence behavior of the animated digital representation of the assistant; and a digital human engine that cooperates with the natural language processing engine to influence behavior of the animated digital representation of the assistant.

16. At least one non-transitory machine-readable storage medium having executable instructions stored thereon, the instructions configurable to cause at least one processor onboard an aircraft to perform an automated method of controlling a component onboard the aircraft, the method comprising:

providing user-specific libraries of actions that can be performed for members of a flight crew and user-specific libraries of actions that can be performed for passengers, where the user-specific libraries of actions that can be performed for members of the flight crew include at least one different action from the user-specific libraries of actions that can be performed for the passengers;

providing area-specific libraries of actions that can be performed for users in each of a plurality of areas of the aircraft, where the plurality of areas includes at least one cabin area and at least one galley area, where the area-specific libraries of actions that can be performed for users in the at least one galley area include at least one different action from the area-specific libraries of actions that can be performed for users in the at least one cabin area;

detecting presence of a user within one of the plurality of areas of the aircraft supported by a display monitor, wherein the detecting is based on output of a proximity sensor;

determining if the detected presence of the user corresponds to a member of the flight crew or a passenger;

in response to the detecting, causing display of an animated digital representation of an assistant on the display monitor;

controlling the animated digital representation of the assistant to react to speech input;

processing speech input of the user with a natural language processing engine to identify at least one action in a selected one of the user-specific libraries of actions and the area-specific libraries of actions to be carried out onboard the aircraft, where the selected one of the user-specific libraries of actions and the area-specific libraries of actions corresponds to the user being a member of the flight crew or being a passenger and/or to the user being in the at least one cabin area or in the at least one galley area;

controlling the animated digital representation of the assistant to respond to the identified at least one action in the selected one of the user-specific libraries of actions and the area-specific libraries of actions; and issuing at least one command, instruction, or control signal to the component onboard the aircraft, to initiate the identified at least one action in the selected one of the user-specific library of actions and the area-specific libraries of actions.

17. The at least one non-transitory machine-readable storage medium of claim 16, wherein the area-specific library of actions that can be identified with the natural language processing engine.

18. The at least one non-transitory machine-readable storage medium of claim 17, wherein the method performed by the at least one processor further comprises: changing at least one trait of the animated digital representation of the assistant in an area-specific manner.

19. The at least one non-transitory machine-readable storage medium of claim 16, wherein the method performed by the at least one processor further comprises:

monitoring flight status of the aircraft; and controlling the animated digital representation of the assistant to provide information that is contextually relevant to the flight status.

20. The at least one non-transitory machine-readable storage medium of claim 16, wherein the method performed by the at least one processor further comprises:

processing the speech input of the user to determine an identity of the user; and selecting at least one trait of the animated digital representation of the assistant based on the determined identity of the user.

* * * * *